Oct. 1, 1957 H. W. RUBINSTEIN 2,808,544

VOLUME CONTROL UNIT

Original Filed July 16, 1948

INVENTOR.
HARRY W. RUBINSTEIN
BY Connolly & Hutz

United States Patent Office 2,808,544

Patented Oct. 1, 1957

2,808,544

VOLUME CONTROL UNIT

Harry W. Rubinstein, Fox Point, Wis., assignor to Sprague of Wisconsin, Inc., a corporation of Wisconsin Original application July 16, 1948, Serial No. 39,104, now Patent No. 2,702,364, dated February 15, 1955. Divided and this application April 7, 1954, Serial No. 424,994

1 Claim. (Cl. 317—242)

This invention relates to improvements in volume controls for electronic circuits. The present application is a division of application Serial No. 39,104, filed July 16, 1948, now Patent No. 2,702,364.

It is desirable to combine as many as possible of the components entering into electronic circuits for the purpose of minimizing the number of connections to be made and the time required in assembling, the number of components for which mounting provisions must be made, and particularly for minimizing the space required for the various components. A well known type of volume control for a radio receiver includes an adjustable resistor and a switch actuated by an arm on the shaft that operates the movable resistor contact. However, it is necessary to employ a capacitor with the resistor and such capacitor has heretofore been a separate component requiring the making of connections thereto, the provision of mounting means for the capacitor and spacing of the capacitor from adjacent components in an electronic circuit.

It is, therefore, one object of the present invention to provide a capacitor for electronic circuits in which a relatively thin and flexible dielectric with conductive coatings formed thereon, is held in place against an insulating member by means supporting both the capacitor and the insulating member and forming one connection for the capacitor with other circuit components.

Another object of the invention is to provide a capacitor for electric circuits in which a disk-like capacitor with conductive coatings formed thereon, is pressed between an insulating member and a plate forming a portion of the means for connecting the capacitor in circuit and for mounting the capacitor in spaced relation with other circuit components.

Another object of the present invention is to provide a volume control for electronic circuits, combining a capacitor and a variable resistor as a single unit.

Objects and advantages other than those above set forth will be apparent from the following description of my invention.

Generally, the present invention is embodied in a device comprising a member of insulating material with a resistor mounted thereon, the insulating member being substantially circular with an extension from the periphery of the member and having a central aperture therethrough. An electrically conductive bushing is fitted into the insulating member aperture and has located coaxially therewith a contact ring with a terminal extending radially therefrom to engage the insulating member extension. A specially formed capacitor is held between the insulating member and a metallic plate that is engaged by a shoulder of the bushing which is fixed in the insulating member by flanging the bushing end over a shoulder in the aperture of the insulating member. One of the capacitor plates is connected with one resistor terminal and the other capacitor plate is connected with the bushing.

A rotatable shaft extends through the bushing and has a piece of insulation fixed at one end thereof as a flange for mounting thereon resilient fingers making contact with the stationary resistor and the contact ring, a snap ring holding the shaft against axial displacement under the action of the resilient contact member. The structure described immediately above is inclosed in a casing on which is mounted a switch of the over-center toggle type. An actuator arm is fixed on the end of the shaft beyond the flange thereon and has lugs engageable with the switch and with an ear in the casing forming a stop limiting shaft movement.

One embodiment of the present invention is illustrated in the accompanying drawings in which.

Figures 1, 2, 3, 4, 5, 6:
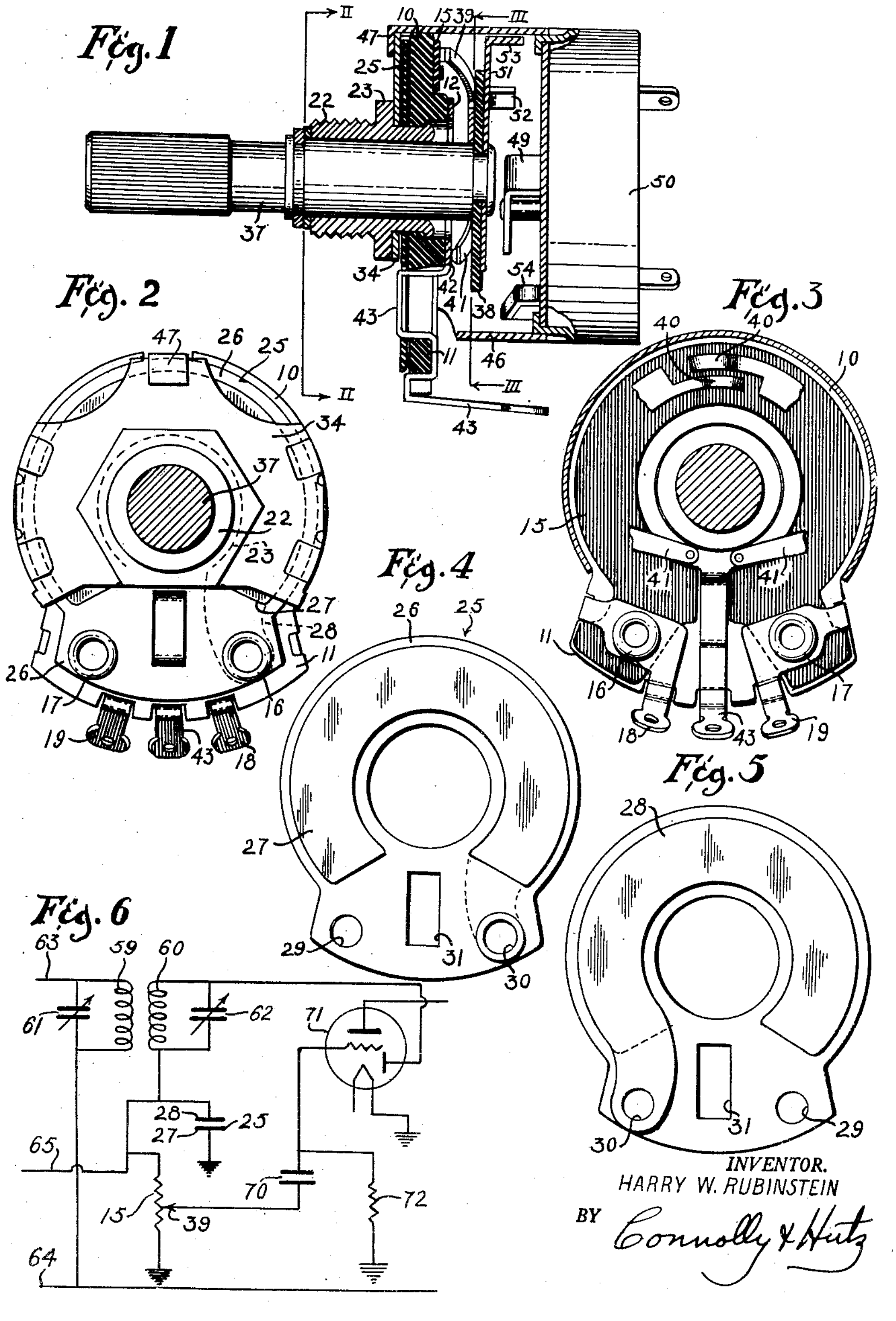
Fig. 1 is an axial cross section on substantially a central plane, of a volume control including a capacitor and a variable resistor and having a switch combined therewith.
Fig. 2 is a transverse section on the plane of line II—II of Fig. 1.
Fig. 3 is a transverse section on the plane of line III—III of Fig. 1.
Fig. 4 is a plan view of one side of the capacitor of the present invention.
Fig. 5 is a plan view of the other side of the capacitor of the present invention.
Fig. 6 is a diagram of a portion of a radio receiver circuit showing the connection therein of the variable resistor and the capacitor of the present combined unit.

Referring to the drawings, 10 designates a substantially cylindrical electrical insulating member with a lateral extension 11 therefrom and with a central aperture therethrough defined in part by a raised rim 12. A substantially annular resistor 15 extends partially around rim 12 and is held in contact with the insulating member 10 by eyelets 16 and 17 passing severally through the resistor ends and severally fixing terminals 18 and 19 on the insulating member. A conductive bushing 22 with a shoulder 23 extends into the insulating member aperture and is fixed therein by forming the bushing end over a shoulder in the aperture, the bushing being externally threaded for mounting on a base.

The bushing shoulder 23 also serves in part to hold a capacitor generally designated 25, against the insulating member 10. The capacitor comprises (see Figs. 4 and 5) a dielectric 26 of flexible material, such as mica, on which are formed conductive coatings 27 and 28 to provide the capacitor plates. Dielectric 26 is apertured as at 29 and 30 for passage of the eyelets 16, 17 therethrough and coating 28 is extended about aperture 30 to make contact with eyelet 16 and terminal 18 thus forming a conductive connection of the coating 28 with one end of the resistor 15. The dielectric 26 is also provided with an aperture 31 for a purpose to be described.

The capacitor is further held against insulating member 10 by a metallic holding plate 34 extending under bushing shoulder 23. Holding plate 34 thus conductively connects capacitor plate 27 with bushing 22 to connect such plate in circuit, i. e., to ground as will be described.

It will be seen that the dielectric is a thin and flexible member which is substantially annular with an extension from the periphery thereof. The extension has a plurality of apertures receiving the terminals of the resistor and the capacitor, one of such extension terminals being common to both such circuit components. The conductive coatings or capacitor plates are substantially annular except interruption at and for about the arcuate length of the dielectric extension, where the terminals are electrically joined therewith and are fixed in the insulating member. The thin and flexible capacitor is clamped against the insulating member by means including a metallic plate substantially covering the capacitor and protecting it against damage, such plate and a bushing also forming one joint terminal for the capacitor and for the resistor. Hence, the dielectric may be very thin and flexible without danger that the coatings thereon might be damaged in use. The metallic plate and the bushing forming the joint terminal for the resistor and the capacitor, fix the position of the capacitor against the insulating member, and support the entire unit in space.

A rotatable shaft 37 extends through and is journaled in bushing 22, one end of the shaft being split and splined to receive a knob for turning the shaft, all of which is well known. A piece of insulation 38 is fixed on one end of the shaft to form a flange-like extension therefrom. A conductive member 39 is fixed on the insulation flange 38 and is formed to provide two sets of resilient fingers 40 and 41 respectively in movable contact with resistor 15 and with a contact ring 42 on insulating member rim 12, both resistor and contact ring being concentric with the bushing 32. Contact ring 42 has a radail extension 43 therefrom which extends through an aperture in insulating member 10 and through aperture 31 in dielectric 26 and thus prevents displacement of the ring. The contact ring terminal 43 thus forms means for connecting the resistor contact member 39, 40, 41 in circuit as will be described.

The resistor, the contact ring and the movable contact therebetween, are inclosed in a casing or cover 46 which is generally cylindrical. The cover wall has ears 47 formed thereon to be bent over holding plate 34 to retain the cover in fixed position relative to bushing 22 and shaft 37.

A switch generally indicated at 49 is mounted in an inclosure 50 fixed on casing 46 in a predetermined relationship, the switch being of the well known over-center toggle type and not disclosed in detail. The switch is operable to open and close a circuit and is combined with the present unit only for convenience and cheapness in assembly and mounting. An actuator plate 51 is fixed on the end of the shaft 37 and has a lug 52 engageable with the switch and a lug 53 engageable with a stop 54 in the casing to limit rotation of the shaft and hence the movement of the contact member 39 to movement from end to end of the resistor.

The present construction forms a volume control particularly adapted for use in radio receivers, a portion of a circuit for such receiver being shown in Fig. 6. In such figure, 59 and 60 respectively designate the primary and secondary winding of a transformer respectively bridged by variable capacitors 61 and 62, the primary winding 59 and its capacitor 61 being connected in a power supply line 63, 64. The transformer secondary winding 60 and its capacitor 62 are connected with line 65 to other portions of the circuit and through a capacitor 25 with ground. Resistor 15 is also connected between the transformer secondary winding and ground. The movable resistor contact 39 is connected through a capacitor 70 to the grid of a tube 71 which is connected through a fixed resistor 72 with ground. The circuit illustrated is a well known form of the detector section of a radio receiver for amplitude modulated waves in which section the amplitude modulated signal impressed across the primary windings of transformer 59, 60 is demodulated and has its carrier frequency bypassed to ground via capacitor 25 resulting essentially in the desired signal alone being impressed by way of blocking condenser 70 to the grid of the detector 71. The variable resistor 15 constitutes a resistive load for the detected signal and provides the desired volume control. As indicated above the combining of capacitor 25 and resistor 15 in a single unit is distinctly advantageous.

It will thus be seen that the present invention combines a variable resistor type volume control with a fixed capacitor, in the simplest possible manner and merely by addition of the capacitor to an existing structure with no material change in the dimensions of such structure or in the method of manufacture thereof. Assembly of the insulating member with the resistor and the capacitor instead of with the resistor alone, involves only inconsequential increase in assembly time because attachment of one resistor terminal also secures attachment of one capacitor plate. No additional time whatever is required for attaching the other capacitor plate due to the fact that assembly of the bushing in the insulating member automatically connects such plate with the bushing which thus becomes one capacitor terminal and is readily connected in circuit.

As many apparently widely different embodiments of the invention may be made without departing from the spirit and scope hereof, it is to be understood that the invention is not limited to its specific embodiments except as defined in the appended claim.

I claim:

In a capacitor structure having terminals in association with a capacitance for an electric circuit, a plurality of juxtaposed terminals, means associating said terminals with the remainder of the capacitor structure, a centrally apertured circular dielectric sheet of relatively thin and flexible material having an extension at its periphery apertured to receive said terminal associating means, two substantially coextensive conductive coatings incapable of self-support formed on opposite faces of the dielectric sheet with the terminal associating means of a first of said juxtaposed terminals in contact with a first of said coatings and the other coating insulated from any of said terminals, a one-sided extension of said first coating running to the peripheral extension of said dielectric sheet for said connection to said terminal associating means of said first terminal, a substantially cylindrical electrical insulating member supporting said juxtaposed terminals and receiving said terminal associating means, a surface of said insulating member substantially coextensive with said dielectric sheet and engaging the face of one of said coatings, a lateral extension of said insulating member on which said terminals are supported, passageways through said insulating member lateral extension and said dielectric sheet peripheral extension for receiving said terminal associating means, an apertured metal plate engaging the face of the other of said coatings on said dielectric sheet and substantially coextensive with said coating, an electrically conductive means extending through the metal plate and the central aperture of the coated dielectric into the insulating member and clamping the parts together so as to hold the terminal associating means for said first terminal in contact with the one-sided extension and supporting the terminal associating means of the other terminals juxtaposed with but insulated from said first terminal and said coatings on said dielectric, one of said passageways through said lateral extension and peripheral extension being an alignment slot and the terminal associating means for the second of said terminals extending through said alignment slot passageway to fix said second terminal insulated and separated from said coatings.

References Cited in the file of this patent

UNITED STATES PATENTS

| | | |
|---|---|---|
| 2,157,715 | Meggenhofen | May 9, 1939 |

FOREIGN PATENTS

| | | |
|---|---|---|
| 339,268 | Italy | Apr. 15, 1936 |
| 452,573 | Great Britain | Aug. 25, 1936 |
| 518,127 | Great Britain | Feb. 19, 1940 |